Aug. 31, 1937. R. P. LEWIS 2,091,409
CLUTCH MECHANISM
Filed Oct. 10, 1932 2 Sheets-Sheet 1
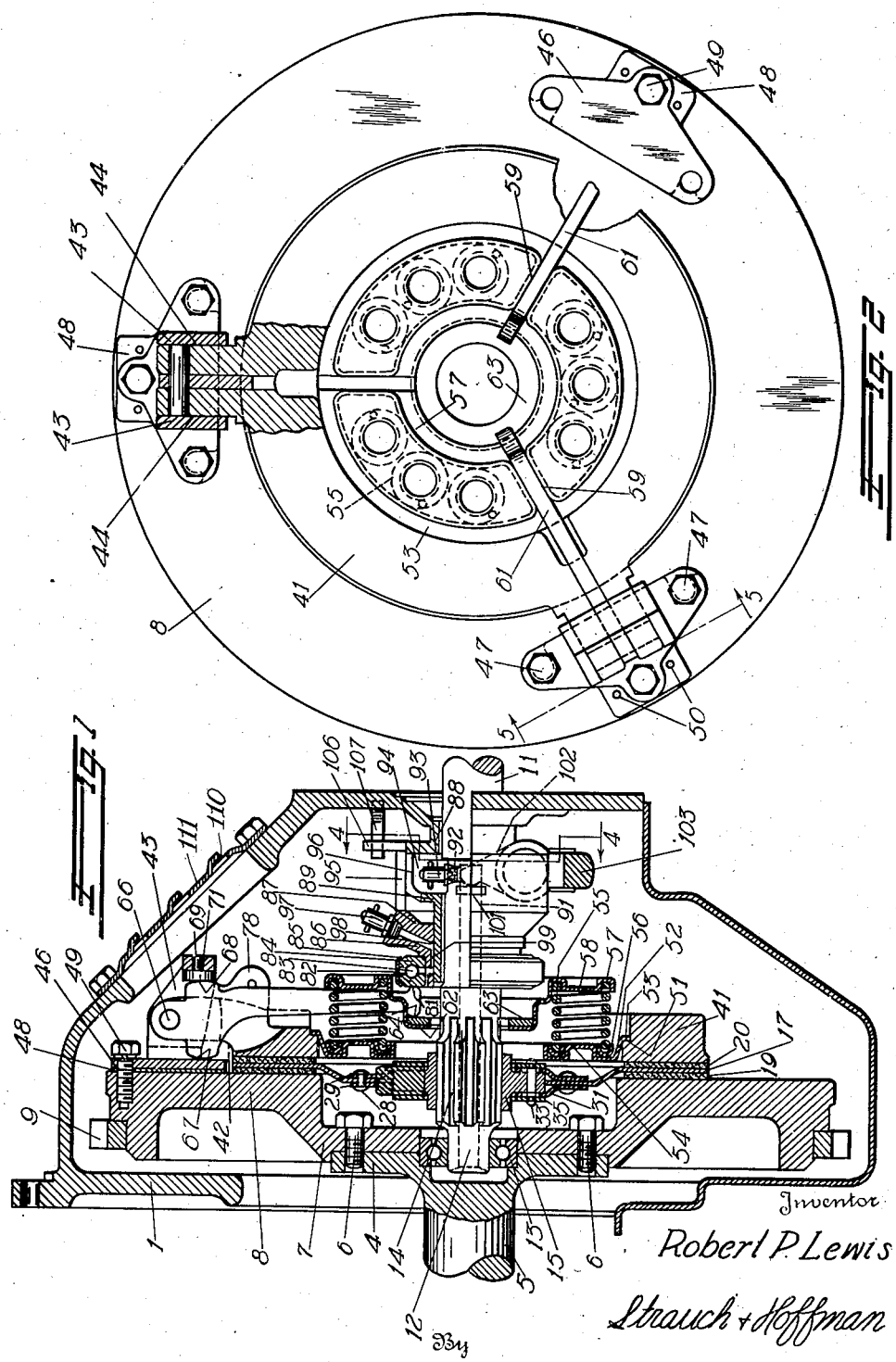
Inventor
Robert P. Lewis
Strauch + Hoffman
By
Attorneys Aug. 31, 1937.                R. P. LEWIS                 2,091,409
                           CLUTCH MECHANISM
                          Filed Oct. 10, 1932          2 Sheets-Sheet 2
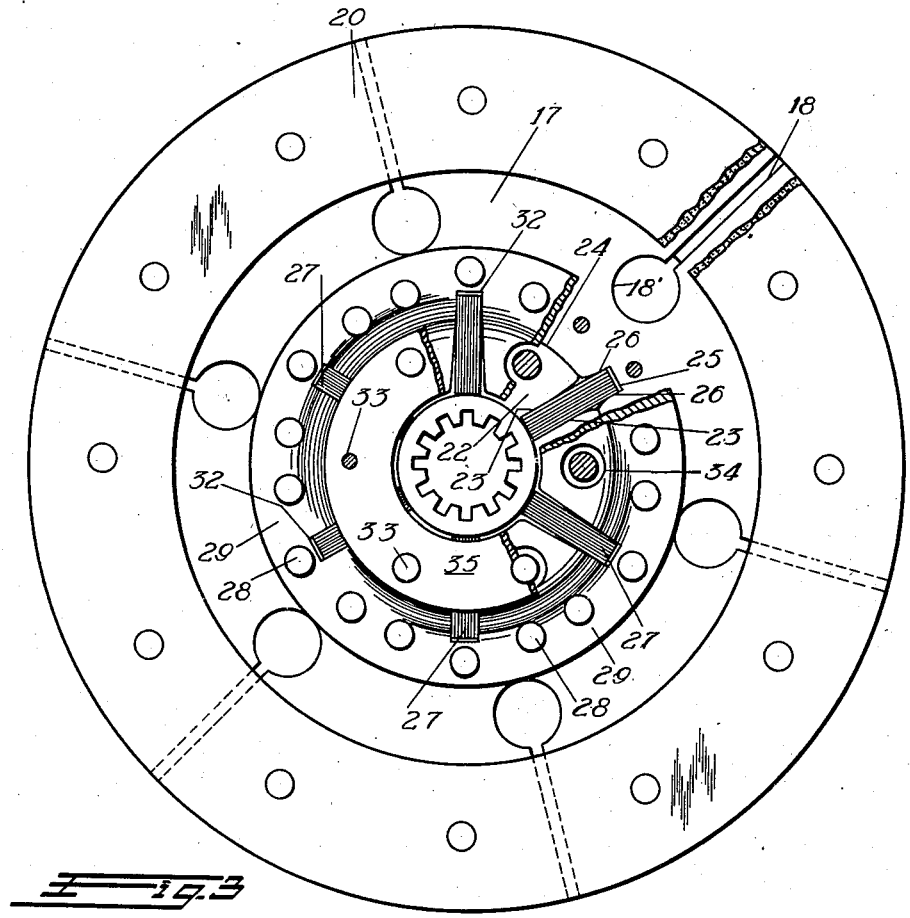
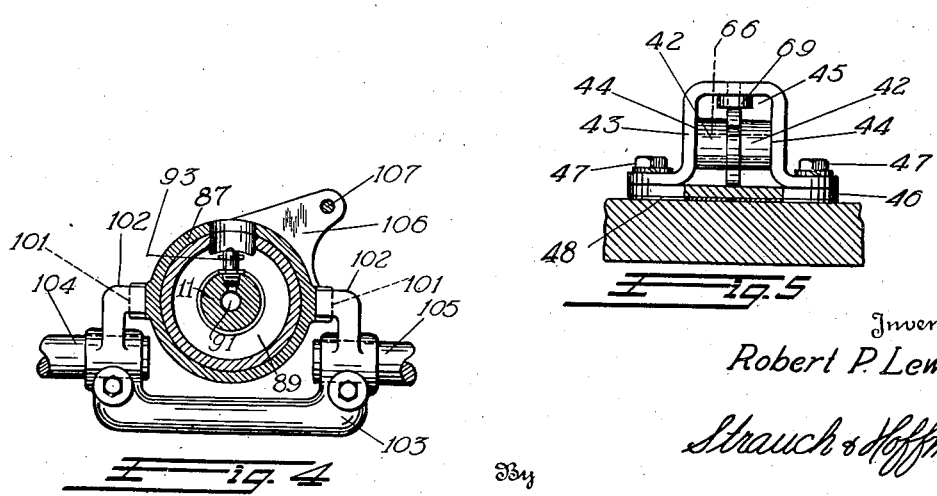
Inventor
Robert P. Lewis
Strauch & Hoffman
By
Attorneys Patented Aug. 31, 1937

2,091,409

UNITED STATES PATENT OFFICE 2,091,409

CLUTCH MECHANISM

Robert P. Lewis, Toledo, Ohio, assignor to Spicer Manufacturing Corporation, Toledo, Ohio, a corporation of Virginia Application October 10, 1932, Serial No. 637,124

9 Claims. (Cl. 192—68)

The present invention relates to clutch mechanisms, and more particularly to clutch mechanisms especially adapted for use in automotive vehicles.

Clutch mechanisms in common use today for automotive and similar purposes are of, generally, such construction that the pressure applied to the driving plates is not evenly distributed with the result that under normal clutch operating conditions the facing material wears away unevenly, and localized areas of the plates become excessively hot, causing comparatively rapid disintegration of the facing material and warpage of the metallic plates. While some clutch mechanisms in use today apply a fairly uniform driving pressure to the plate when the clutch mechanism is new, and the driving and driven shafts are in perfect alignment, after the clutch mechanism has been used for a short time, or in the event that the driving and driven shafts are not assembled in substantially perfect alignment, the driving pressure becomes poorly distributed, with resultant excessive non-uniform wear and localized heating of the clutch element.

A further inherent disadvantage of prior clutch mechanisms resides in the fact that initial adjustment of the clutch at the factory is difficult and subsequent adjustment to compensate for wear of the clutch plates and for the purpose of establishing substantial parallelism thereof is almost impossible. Obviously non-parallelism of the clutch plates, which are designed for slipping engagement with each other, results in rapid wear of the clutch elements, and causes clutch engagement to occur with a chattering and grabbing action.

Another difficulty with automotive clutch mechanisms in common use is that under high-speed, high-torque conditions, regardless of whether the clutch is correctly adjusted or not, slippage of the clutch plates occurs, causing rapid wear of the facing material and the clutch plates. In an effort to overcome this difficulty, driving pressures have been increased and while this expedient overcomes the difficulty of clutch plate slippage under high speed, high torque conditions, it increases the pedal pressures necessary to operate the clutch mechanism which is undesirable, particularly in vehicles of the pleasure car class.

Accordingly, a primary object of the present invention is the provision of a low cost clutch mechanism wherein the driving pressure of the spring means employed is uniformly distributed about the entire area of engagement of the clutch plates, so that uniform engagement, minimum wear and long life are assured.

A further object of the present invention is to provide a low cost clutch mechanism adapted for large volume production wherein driving pressure is uniformly distributed about the entire area of engagement of the clutch members and the elements are so related that proper distribution of pressure is maintained regardless of substantial misalignment of the driving and driven shafts and clutch parts.

A further object of the present invention is to provide a clutch mechanism wherein adjustment of the clutch members may be readily established at the factory and after the clutch has been in use, should the necessity for so doing arise.

Another object of my invention is to provide a clutch mechanism wherein novel means are employed for exerting pressure on the driving plates.

Other objects of the present invention will become apparent as the description thereof proceeds in connection with the accompanying drawings.

In the drawings:

Figure 1 is a longitudinal sectional view of the clutch mechanism forming a part of the present invention.

Figure 2 is a view of the clutch mechanism disclosed in Figure 1 as it appears when viewed from the right hand side of that figure, and partially in section, with the clutch housing removed for the purpose of facilitating the illustration.

Figure 3 is a side view of the driven member, as it appears when removed from the clutch mechanism and having parts thereof broken away.

Figure 4 is a fragmental section taken on line 4—4 of Figure 1, looking in the direction of the arrows.

Figure 5 is a detailed sectional view taken on line 5—5 of Figure 2 and illustrates the association of the saddle members with the flywheel face.

With continued reference to the drawings, wherein like reference characters designate like parts throughout the several figures thereof, the clutch housing is designated generally at 1 and is adapted to be bolted to the engine bell housing in well known manner. Secured to flange 4, of engine or driving shaft 5, by means of bolts 6 or the like, is web portion 7 of flywheel 8. The periphery of flywheel 8 is provided with the usual starting gear 9.

Disposed in axial alignment with the driving shaft, and mounted for rotation, is driven shaft 11, which is reduced at 12 and journaled in a suitable antifriction pilot bearing assembly 13, secured in a bore in the end of shaft 5, which is lubricated in a manner presently to be described.

Driven shaft 11 is adapted to have the other end thereof operably connected to a suitable gear changing or other variable speed transmission (not shown) for applying the torque applied to the final driven member. Driven shaft 11 has a splined portion 14, on which a correspondingly splined hub 15 is slidably mounted. Hub 15 is resiliently connected to driven disk 17 by means of a dampener mechanism that will presently be described. Disk 17 is provided with a plurality of radially extending slots 18, which extend to the periphery thereof and terminate at their inner ends in openings 18'. Slots 18 give disk 17 extreme flexibility in an axial direction and permit accommodation thereof to slight angular misalignment of the clutch plates, while apertures 18' provide for distribution of cooling air on each side of disk 17 as will be more particularly hereinafter pointed out.

Each face of disk 17 near the periphery thereof is provided with a lining 19 and 20 respectively, which may consist of any material that has the required characteristics to give the correct frictional gripping force, and at the same time has wearing qualities adapting it for this purpose. Frictional facings 19 and 20 may be secured to disk 17 in any suitable manner, as for instance by rivets or the like.

Referring more particularly to Figure 3 of the drawings, hub 15 is provided centrally of its length with a flange 22 which is slotted at intervals around its periphery to provide substantially rectangular recesses having walls 23 which constitute driving faces. Walls 23, near the outer periphery of flange 22, are given a slightly curved configuration for a purpose that will presently appear. The recesses formed in flange 22 are shown in the present instance as being six in number, and while this number has been found to give very good results in practice, it is understood that the recesses may be more or less than six in number without sacrificing the advantages of the present invention. Flange 22 rather snugly fits in an aperture 24 formed in plate 17 for limited angular movement with respect thereto. Substantially rectangular notches 25 having walls 26 providing driving faces are formed in disk 17 and are coextensive with those formed in flange 22. The inner ends of walls 26 of notches 25 formed in plate 17 are given a diverging configuration for a purpose that will presently appear.

Disk 17 is resiliently connected to hub 15 for yieldingly transmitting torque thereto by means consisting of a plurality of leaf spring units or packs 27, which are disposed rather snugly at one end in recesses 23 formed in flange 22, and at the other end seat rather closely in recesses 25 formed in disk 17.

From the structure so far developed, it will be seen that should a sudden rotational impulse be given disk 17 in clockwise or counterclockwise direction, hub 15 will not immediately respond thereto, but springs 27 will flex and take a position in surface contact with walls 23 and 26. It is therefore seen that springs 27 establish a resilient yielding connection between disk 17 and hub 15, thus effectively cushioning transmission from one member to the other. It will moreover be seen that the resilient coupling is double acting, and if a vehicle provided with this mechanism is proceeding down grade with the transmission in high gear, and with the clutch thrown out, if the operator suddenly reengages the clutch, hub 15 becomes the driving member, and the sudden rotational impulse transmitted by member 15 to member 17 is cushioned by springs 27. If the resilient connection disclosed were not interposed between hub 15 and disk 17, a severe shock would be transmitted from hub 15 to disk 17 upon reengagement of the clutch with possible damage to the driving mechanism. However, with the present resilient connection incorporated in the mechanism, upon reengagement of the clutch, springs 27 will merely flex in the opposite direction, cushioning any torque impulse that might result in a damaging shock to the mechanism. Springs 27 are preferably designed and tempered so as to present such a degree of stiffness during normal torque delivering operation that they will not flex to their fullest extent or into full contact with the curved faces defining notches 23 and 25, but will only be slightly flexed so that each impulse of torque delivered by the engine can be absorbed and stored in the spring thereby giving a smooth torque delivery to the final driven member.

Leaf springs 27 may be flexed so as to lie over the full area of the curved faces of recesses 23 and 25, in response to a reasonably large sudden impulse transmitting effort from one member to the other. To prevent undue flexing of springs 27, under extremely severe conditions, disposed on either side of disk 17 and rigidly secured thereto by means of rivets 28 or the like, are a pair of plates 29. Plates 29 are offset at 31 to provide a sliding fit between the same and flange 22 formed on hub 15. Plates 29 are further provided with recesses 32, which are coextensive with recesses 25 formed in disk 17 inwardly to the periphery of disk 17, where the walls thereof diverge as shown in Figure 3 of the drawings.

The clearance provided between the springs 27 and the diverging walls of plate 29 is sufficient to allow normal flexing movement of springs 27 under fairly severe conditions, and it will be noted that the outer portions of the walls defining recesses 32 in plates 29 are flush with the recesses 25 formed in plate 17, and therefore form additional driving faces, and the inner extremities of recesses 32 form stops so that when springs 27 have been flexed to a predetermined normal extent, the outer leaves of springs 27 contact with the diverging walls of plates 29, and a positive drive thereafter is established between disk 17 and hub 15. It is to be understood that springs 27 are designed to absorb any reasonably large torque impulse without flexing sufficiently to contact with the diverging faces of recesses 32. Thus the limiting walls of recesses 32 are seen to constitute a safety device to prevent springs 27 from being flexed beyond their elastic limit, which might cause them to take a permanent set or to be excessively distorted.

A slidable connection is provided between the inner periphery of plate 29 and flange 22 to permit their relative movement during flexing of springs 27, by means of shouldered pins 33 which extend through oversized openings 34 formed in plates 29. Pins 33 are inserted in openings 34, and a plate 35 is disposed on opposite sides thereof and through which the end portions of pins 33 extend. After assembly, the ends of pins 33 are then headed over as shown in Figure 1, so that plates 35 are rigidly connected to each other and permit a limited range of movement of disk 17 on flange 22 of hub 15. It will be also noted, by referring to Figure 1 of the drawings, that plates 35 securely hold springs 27 in assembled relation with hub 15 and disk 17.

Facing 19 provided on disk 17 cooperates with the flat face of flywheel 8 and is adapted to engage and be frictionally driven thereby. Facing 20 provided on disk 17 cooperates with a plate 41 which will be hereinafter termed the driving plate, for the reason that it is adapted to engage and clamp driven member 17 between it and the flat face of the flywheel. Plate 41 is of substantial thickness so that it may possess a certain degree of rigidity which thereby prevents distortion and warpage thereof during clutch operation. Plate 41 is driven by flywheel 8, and is permitted to move axially thereof for clutching and declutching purposes by means of pairs of ears or lugs 42 that are provided on plate 41 at approximately 120° intervals, and are preferably formed integral therewith. Lugs 42 extend outwardly beyond the periphery of plate 41 into saddle members 43 which provide driving faces 44 that closely abut the opposite side of each lug assembly, and are adapted for sliding engagement therewith. Saddle members 43 are provided with a space indicated at 45 (Figure 5) that is sufficient to accommodate lugs 42 throughout their entire range of sliding clutching and declutching movements. The lower ends of saddle members 43 are deflected to lie in a horizontal plane and are apertured and secured to the flat face of plates 46 by means of cap screws 47 or the like. Removably disposed between plates 46 and the face of the flywheel are a plurality of shims 48 which may be inserted or removed for the purpose of adjusting plate 46 toward and away from the flywheel face. Shims 48 are slotted so that one or more of them may be removed from the assembly without disturbing the saddle members or plates 46 by merely loosening bolts 47, removing cap screws 49, and slidably manipulating the shims.

Saddle members 43 are preferably formed of sheet metal stampings because their novel design renders this material entirely suitable for this purpose. It is therefore seen that driving plate 41 is mounted for rotation with flywheel 8 in a very economical manner, and is at the same time permitted to move axially thereof throughout a limited range of movement. Each plate 46 is held in place on the flywheel by means of a cap screw 49 so that screws 47, along with saddle 43 may be removed without disturbing plate 46 and the set of shims 48 associated therewith. Each shim 48 is provided with small apertures 50 into which a suitable tool may be inserted for the purpose of withdrawing the shims.

Plate 41 is normally urged toward the flywheel by means of a spring assembly consisting of a plurality of springs interposed between a pair of annular reacting members. Plate 41 is provided with an annular seat 51 against which an annular reacting plate 52, having a flange 53, is adapted to rest. Plate 52 receives the reaction of springs 55 and transmits it to plate 41, and is made of sheet metal suitably formed to give it sufficient rigidity. Plate 52 is provided at suitable intervals around its periphery with depressed portions 54 which are adapted to center and form seats for one end of compression springs 55. Interposed between springs 55 and plate 52 are heat insulating gaskets 56 which may consist of any suitable material having heat insulating properties, for preventing the transfer of heat from pressure plate 41 to springs 55 so that their proper temper may be maintained.

The other ends of springs 55 cooperate with an annular plate 57 which is provided with depressions 58 for centering the springs. Springs 55 seat directly against plate 57 for the reason that no heat is generated by any of the elements in contact with plate 57 and hence no insulating means are required. Plate 57 is provided at approximately 120° intervals about its periphery with offset portions 59 which receive the inner ends of throwout levers 61, and which are suitably reenforced in these regions by suitable forming operations. The inner edge of plate 57 is provided with a flange extending toward the flywheel and which terminates in an annular flange 62 which is normal to the clutch axis. Seating on flange 62 and preferably secured thereto as by welding or the like is a relatively thick hard metal ring 63. Ring 63, in response to the action of springs 55, is urged toward and rests against curved faces 64 formed on throwout levers 61. In view of the fact that levers 61 are three in number, the action thereof would produce localized pressures in flange 62, if it contacted them directly. Therefore, ring 63 being of substantial thickness and rigidity, distributes the reaction pressure of throwout levers 61 around the entire periphery of flange 62 which is of relatively light gauge sheet metal.

While the spring organization just described gives excellent results and is preferred, springs 55 and seat members 52 and 57 could be replaced by a single spring of the type disclosed in the application of Charles B. Spase, Serial No. 527,429, filed April 3, 1931, and good results obtained.

Throwout levers are preferably three in number so that ring 63, in response to the action of springs 55, is urged into a stable position on a three point support, and accordingly exerts an equal pressure upon each lever. The outer end of each throwout lever 61 is disposed between a pair of lugs 42 and is journaled therein on a pin 66 seating in apertures in lugs 42. In view of the fact that pins 66 abut walls 44 of saddle members 43, no other means than this is required to hold them in assembled position in the mechanism. Provided on opposite faces of levers 61 are curved fulcrum faces 67 and 68 respectively. Fulcrum face 67 cooperates with the outer face of plate 46 when declutching operations are being effected, and fulcrum face 68 cooperates with a hardened steel plug or bearing member 69, that is frictionally fitted in an aperture 71 formed in the top of each saddle member 43. Enough clearance is provided between plates 46 and plugs 69 to permit levers 61 to rock freely therebetween. Plugs 69 reenforce the horizontal portions of saddles 43 against flexing in response to pressure exerted thereon by fulcrums 68, and at the same time present a surface for cooperation with fulcrums 68 that has good wearing qualities. It should be noted that there is no tendency whatever for levers 61 to rotate in a plane normal to the clutch axis in response to rotation of the clutch mechanism, because they are disposed exactly radially, and have each end of their pivots supported in lugs 42, so no tendency to bind is present.

From the structure so far developed, it will be seen that plate 41 is urged toward the flywheel by the direct pressure of the inner ends of springs 55 and plate 41 is further urged toward the flywheel by the other ends of springs 55 which bear against levers 61 and exert an amplified force upon plate 41, due to their force multiplying disposition. When the inner ends of levers 61 are urged toward the flywheel, fulcrum faces 67 thereof will contact with the top of plates 46, thus urging pivots 66 away from the flywheel, and since pivots 66 are journaled in lugs 42 of plate 41, plate 41 is accordingly withdrawn from disk 17. At all other times fulcrum faces 68 formed on levers 61 are held in tight contact with plugs 69 by virtue of the pressure exerted on levers 61 by springs 55, thus urging plate 41 toward the flywheel web.

Formed on the top face of lugs 42 are apertured ears 78 through which a pin may be inserted to hold throwout levers 61 in assembled relationship with the rest of the mechanism while assembly and disassembly operations are being carried out.

The mechanism for causing declutching movements of throwout levers 61 will now be described. Cooperating with curved faces 81 formed on the inner extremities of levers 61 is the flat face of ball race 82 which cooperates with antifriction balls 83 disposed therebetween and a similar ball race 84. Ball races 82 and 84 are held in loosely assembled relation with respect to each other by means of retainer member 85. Ball race 84 is rigidly mounted upon a sleeve 86, having an offset portion 87, that is slidably mounted upon a supporting sleeve 88, having an offset portion 89 upon which offset portion 87 of sleeve 86 is slidably associated. Supporting sleeve 88 is preferably formed integrally with housing 1, and has the bearing faces thereof machined and ground so as to be in exact alignment with shaft 5 when the clutch is assembled, and to provide a close fit with sleeve 86, for sliding movement with respect thereto. Supporting sleeve 88 is spaced considerably from driven shaft 11 and is accordingly independent thereof.

Driven shaft 11 is provided with a central bore 91 which extends entirely through reduced portion 12 thereof in one direction, and the other end communicates with a transverse bore 92, into which is tapped a suitable grease fitting 93. The annular portion of support 88 provides an annular space 94 in which grease fitting 93 is adapted to travel in a circular path with shaft 11. Members 87 and 89 are cut away, preferably at the top thereof, sufficiently at 95 and 96 respectively to allow the introduction of a grease gun for cooperation with grease fitting 93 to introduce lubricant into passages 91 and 92. When it is desired to lubricate bearing 13, the grease gun is inserted through the usual opening in housing 1 and shaft 11 rotated in any suitable manner to bring grease fitting 93 into coincidence with apertures 95 and 96 for connection with grease fitting 93. The grease or other suitable lubricant is forced into passages 91 and 92 and thence into the antifriction bearing assembly 13 located in the flywheel web.

Lubrication for the sliding movements of sleeve 86 upon supporting sleeve 88 is provided by a grease fitting 97 which is tapped into passage 98 communicating with a lubricant distributing groove 99 located in sleeve 86. Access to this grease fitting is also gained through the usual hand hole located in the clutch housing.

Formed on opposite sides of sleeve 86 are lugs 101 which cooperate with throwout fingers 102 connected by yoke 103. Rigidly secured in yoke 103 are shafts 104 and 105 which are journaled in the clutch housing in well known manner (not shown). Mounted on the end of shaft 104 is the usual clutch pedal (not shown). While sleeve 86 may be keyed or splined to supporting sleeve 88 in any desirable manner to prevent rotation thereof, and at the same time permit axial movement for clutching and declutching purposes, I prefer to provide an apertured ear or lug member 106 upon sleeve 86 for cooperation with lug 107 secured in the clutch housing.

It will be particularly noted that driven shaft 11 fits loosely in supporting sleeve 88 which is stationarily mounted in the housing, and therefore substantial eccentricity or angularity of misalignment of driving shaft 5 and driven shaft 11 can have no substantial effect upon the operation of the throwout bearing assembly. Moreover, since there is slight possibility of driving shaft 5 being thrown out of alignment, and the bearing faces of support 88 are carefully machined to lie exactly parallel to driving shaft 5, a permanent alignment is assured and the throwout bearing assembly will always cause plate 41 to be parallel to the flywheel regardless of whether the clutch is engaged or disengaged. Moreover due to the three point engagement of member 63 therewith levers 61 will be held tight at all times regardless of manufacturing inaccuracies or inaccuracies that arise due to wear by the engagement of collar 63 with the levers. During clutching and declutching operations the ends of levers 61 will also have a three point support on the face of the throwout bearing assembly, while the throwout bearing is positively maintained in proper alignment by virtue of the stationary guiding means formed on the clutch housing, providing smooth clutch action with minimum pedal operation at all times.

Moreover, it will be noted that due to the entire absence of a rim on the flywheel, and of the usual cover or any other structure associated with the clutch mechanism that might impede air flow induced by rotation of the clutch elements, or inhibit free radiation of heat therefrom, and also the plane face of the flywheel beyond the driving face thereof, dissipation of heat from the clutch elements by radiation and convection is extremely rapid. Moreover, as the facing material wears and particles thereof are dislodged, this material is free to leave the clutch mechanism and is carried away by the air stream produced by rotation of the clutch elements. The absence of the usual rim on the flywheel moreover materially reduces machining and production costs and adapts it for large volume, low cost production methods.

In view of the fact that reaction plugs 69 and plate 46 may be adjusted toward and away from the flywheel by means of shims 48 interposed therebetween, should it be found upon assembling clutch mechanism at the factory that plate 41 is disposed in non-parallel relation with the flywheel web, shims 48 may be inserted or withdrawn from certain saddle members 43 in order to bring about parallel relation of the plates. As has just been pointed out, each plate 46 is held in place on flywheel 8 by means of a single bolt 49, which is independent of saddle member 43, therefore saddle members 43 may be removed from the clutch mechanism without in any way disturbing shims 48 and the proper adjustment will thereby be maintained. It is contemplated that this adjustment be in the nature of an initial factory adjustment for the reason that after the clutch mechanism has been in use, there is no chance for plate 41 to work itself into non-parallel relation with the flywheel web because the wear on the faces of levers 61 occurs to an equal extent upon each of them, since they are acted upon by an equal force, namely one-third of the total pressure exerted by springs 55, due to the nature of the connection existing between the springs 55 and collar 63.

Air currents induced by the rotation of the clutch elements are drawn into louvers 110 provided in the cover 111 for the hand opening in the housing, and are caused to flow outwardly over the faces of the plate, thereby abstracting heat therefrom and at the same time carrying away any particles that have been dislodged from the facing material as a result of operation. The openings 18 formed in disc 17 permit air to enter and flow over the face thereof adjacent the flywheel. The continuous outward flow of air over both faces of disc 17 effectively cools all of the clutch elements, and at the same time prevents the conduction of heat inwardly into the dampener assembly thereby avoiding the possibility of drawing or seriously modifying the temper of leaf springs 27 thereof.

It will therefore be seen that low cost, highly effective, simplified clutch mechanism has been provided in which slight inaccuracies in machining, assembly, or due to wear in use have no substantial effect and which, due to its heat dissipating capabilities, thorough ventilation and self-aligning qualities of its parts will, at moderate pedal pressures, handle substantially greater loads with materially longer life than prior clutch mechanisms of like size.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a clutch mechanism, a driving member; a driving clutch plate; spring means urging said driving clutch plate into engaged position; lever means for withdrawing said driving clutch plate into disengaged position against the action of said spring means; and means for fulcruming said lever means upon said driving member comprising a plurality of apertured members having fulcruming faces, secured to said driving member and through which said lever means extends, means associated with said apertured members for permitting adjustment thereof toward and away from said driving member whereby substantial parallelism of said driving member and said driving clutch plate may be established, and means associated with said apertured members whereby said adjustment may be effected without removing said apertured members from the mechanism.

2. In a clutch mechanism, a driving member; a driving clutch plate; spring means urging said driving clutch plate into engaged position; lever means for withdrawing said driving clutch plate into disengaged position against the action of said spring means; means fulcruming said lever means upon said driving member comprising a plurality of apertured members having fulcruming faces and secured to said driving member and into which said lever means extends; means for adjusting said apertured members toward and away from said driving member, whereby substantial parallelism of said driving member and said driving clutch plate may be established, and means associated with said driving member whereby said apertured members can be removed from said mechanism without disturbing said adjusting means.

3. In a clutch, in sub-combination, a rotatable clutch member, a plurality of outwardly extending levers supported by said member; a pressed metal plate element having a surface disposed normal to the axis of rotation; a plurality of springs seating against said plate element and urging the latter axially toward said levers; and a comparatively rigid, flat annular member secured to said plate element in contact with the normal surface thereof; for preventing distortion of said plate element under the action of said springs and levers.

4. In a clutch in sub-combination, a flywheel having a surface disposed normal to the axis of rotation, a U-shaped member and a plate member secured to the surface of said flywheel and constituting a saddle assembly, said plate member being disposed between said flywheel and the legs of said U-shaped member, thereby defining a substantially rectangular aperture, and a plurality of shims detachably disposed between said plate and said flywheel, whereby said saddle assembly may be adjusted toward and away from the latter.

5. In a clutch, in sub-combination, a rotatable supporting structure, an annular clutch plate mounted upon said supporting structure for synchronous rotation therewith and for movement axially thereof, said clutch plate having a frictional driving surface disposed substantially normal to the axis of rotation, the inner cylindrical wall of said clutch plate having an abutment face provided thereon facing away from said supporting structure, an annular force distributing member disposed within said clutch plate and having its surface substantially flush with the frictional surface of said clutch plate, and having an offset flange engaging behind said abutment face, and a plurality of springs seating upon said force distributing member and urging the latter into engagement with said clutch plate.

6. In a clutch, in sub-combination, a saddle assembly for fulcruming a clutch lever, comprising a generally U-shaped bracket, a fulcrum plate adapted to be secured to said bracket and bridge the legs thereof, and a fulcrum plug having a reduced portion seating in the bight of said bracket, the surfaces of said fulcrum plate and fulcrum plug being substantially parallel and defining a pair of fulcrum faces for a declutching lever.

7. In a clutch, driving and driven members mounted for engagement and disengagement, a plurality of outwardly extending levers for controlling engagement and disengagement of said members, a plate element having an annular surface disposed normal to the axis of the clutch and engaging the inner ends of said levers, a plurality of compression springs seating against and urging said plate element axially toward said levers; and a throwout mechanism mounted for axial movement, said throwout mechanism supporting a bearing having an annular surface normal to the clutch axis and co-extensive with the surface of said plate element, the inner ends of said levers being disposed, and adapted to be clamped between said plate element and said bearing surfaces, the portions of said plate element against which said springs seat being axially offset a substantial distance from the said annular surface of said plate element.

8. In a clutch, driving and driven members mounted for engagement and disengagement; a plurality of outwardly extending levers for controlling engagement and disengagement of said members; a plate element having an annular surface disposed normal to the axis of the clutch and engaging the inner ends of said levers, a plurality of compression springs seating against, and urging said plate element axially toward said levers; a throwout mechanism mounted for axial movement, said throwout mechanism supporting a bearing having an annular surface normal to the clutch axis and co-extensive with the surface of said plate element, the inner ends of said levers being disposed, and adapted to be clamped between said plate element and said bearing surfaces, the portions of said plate against which said springs seat being axially offset from the annular surface of said plate element a distance at least as great as the axial thickness of the inner ends of said levers.

9. In a clutch, driving and driven members mounted for engagement and disengagement; a plurality of outwardly extending levers for controlling engagement and disengagement of said members; a plate element having an annular surface disposed normal to the axis of the clutch and engaging the inner ends of said levers, a plurality of compression springs seating against, and urging said plate element axially toward said levers; a throwout mechanism mounted for axial movement, said throwout mechanism supporting a bearing having an annular surface normal to the clutch axis and co-extensive with the surface of said plate element, the inner ends of said levers being disposed, and adapted to be clamped between said plate element and said bearing surfaces, said plate element being provided with a cup-shaped portion within which said bearing nests, said bearing being spaced from said plate element at all points, said annular surface defining the bottom of the cup.

ROBERT P. LEWIS.